March 29, 1966     H. D. FORSTER, JR     3,243,686
INVERTER CIRCUIT UTILIZING SILICON CONTROLLED RECTIFIERS
PULSED BY PHASE DELAYING NETWORKS
Filed May 9, 1962

INVENTOR.
HARRY D. FORSTER JR.
BY S. C. Yeaton
ATTORNEY

United States Patent Office 3,243,686
Patented Mar. 29, 1966

3,243,686
INVERTER CIRCUIT UTILIZING SILICON CONTROLLED RECTIFIERS PULSED BY PHASE DELAYING NETWORKS
Harry D. Forster, Jr., Roslyn Heights, N.Y., assignor to Sperry Rand Corporation, Great Neck, N.Y., a corporation of Delaware
Filed May 9, 1962, Ser. No. 193,386
10 Claims. (Cl. 321—45)

This invention relates to switching circuits and more particularly to inverter circuits for periodically reversing the polarity of a D.C. voltage applied to a pair of load terminals.

Inverter circuits have been developed which utilize a pair of controlled rectifiers. The rectifiers are caused to conduct alternately so as to reverse the direction of current flow through the load. Both gaseous and solid state controlled rectifiers have been employed for this purpose, however some artifice must be employed in either event to turn off the rectifiers since the control elements in these devices become ineffective once the rectifier begins to conduct current. Commutating capacitors have customarily been employed as energy storage elements for turning off the controlled rectifiers in these circuits. These elements, however, must necessarily be large and cumbersome in order to perform properly.

Furthermore, prior art circuits frequently fail because the commutating means is unable to store sufficient energy during the cycle to turn off one controlled rectifier by the time the second rectifier is turned on. The two controlled rectifiers then conduct simultaneously which results in a short circuit that disables the entire device.

It is an object of the present invention to provide an inverter that does not require cumbersome energy storage devices for switching.

It is another object of the invention to provide an inverter that is relatively free from switching failures.

It is still another object of the invention to provide an inverter that is capable of operating over a relatively wide range of frequencies.

These and other objects are achieved in the present invention by providing an auxiliary switching means that delays turning on one controlled rectifier until the opposite rectifier has been turned off for a predetermined time.

The nature and operation of the invention will be better understood by considering the following description in connection with the accompanying drawings wherein.

Figure 1:
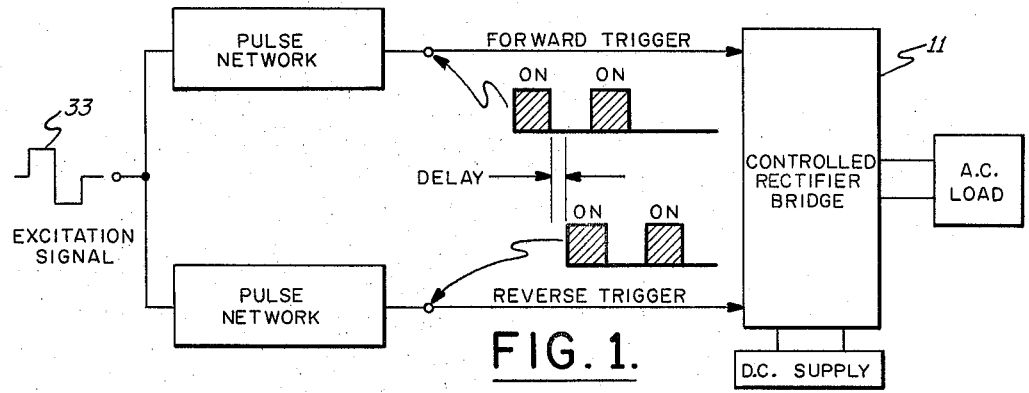
FIG. 1 is a diagram useful in explaining the operation of the invention.

FIG. 1 illustrates the general principle of operation. The controlled rectifier bridge, to be described, serves to couple current from the D.C. supply to an A.C. load alternately in a forward and a reverse direction. These alternations of the current are controlled by an external driving means comprising a pair of pulse networks. The pulse networks supply trigger signals suitable for switching the bridge elements at a repetition rate determined by an excitation signal. The pulse networks modify this excitation signal so that a specified delay exists between the termination of one trigger pulse and the beginning of the next trigger pulse. This delay assures that the inverter elements governing the flow of load current in one direction are completely turned off before the opposite inverter elements are turned on. Simultaneous conduction cannot occur.

Figure 2:
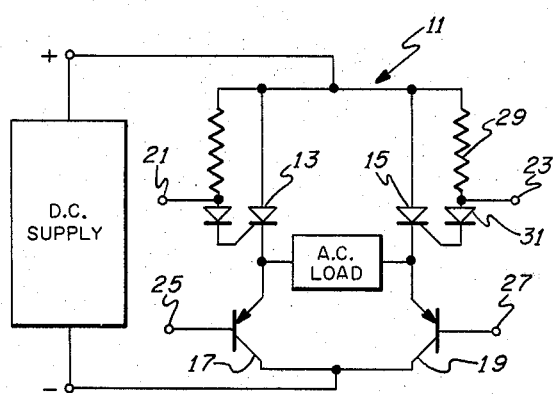
FIG. 2 is a schematic diagram of a bridge circuit useful in practicing the invention.

FIG. 2 illustrates a controlled rectifier inverter bridge that may be used in practicing the invention. The inverter bridge circuit preferably comprises a pair of silicon controlled rectifiers 13 and 15 and a pair of p-n-p transistors 17 and 19. Trigger signals are supplied to the gate electrodes of the rectifiers by way of the terminals 21 and 23 and to the base electrodes of the transistors through the terminals 25 and 27. A biasing resistor 29 is inserted between each of the terminals 21 and 23 and the anode of the respective rectifiers. A diode 31 is inserted between each gate terminal and the corresponding gate electrode to prevent reverse breakdown of the controlled rectifier.

The bridge circuit is operated so that a rectifier and the transistor in the bridge arm opposite this rectifier act as a pair of switching elements. By causing one pair, such as a rectifier 13 and transistor 19 to conduct, a forward current can be passed through the load. By causing the opposite pair to conduct, a reverse current can be passed through the load.

The transistors are used to turn off the controlled rectifiers. The gate electrode of the conducting rectifier is effectively grounded and a positive voltage is applied simultaneously to the base of the associated transistor. The positive base voltage drives the transistor into a nonconducting region and opens this circuit. Thereafter, a trigger voltage is applied to the second pair of electron devices to permit current flow through the load in a reverse direction.

When one or the other of the pairs of electron devices is to be driven to conduction, a positive voltage is applied to the gate electrode of the appropriate controlled rectifier at the same time that a negative voltage is applied to the base of the associated transistor. Since the gate electrode must be driven positive by an appreciable amount before the rectifier will conduct, the simultaneously occurring transistor signal is able to drive the transistor into a highly conductive region before the main current flow is established. In this way, the rectifier cooperates to keep switching losses in the transistor to a minimum.

The controlled rectifiers are desired as circuit elements because they have high current handling capabilities, superior temperature characteristics, and low loss. The desirable switching characteristics of the transistors are utilized to overcome the problems in turning off the rectifiers.

The particular arrangement of bridge components illustrated in FIG. 2 provides a highly efficient circuit, since during conduction the control currents for the active rectifier and for the active transistor both pass through the load. In other arrangements of similar components, these currents must be provided in addition to the load current.

The particular bridge circuit of the present invention thus combines the advantages of the two types of electron devices, and eliminates the need for cumbersome energy storage elements. Since it is not necessary to charge an energy storage unit in order to effect turn-off, a conducting rectifier can be turned off at any time after it is turned on, and higher switching rates can be accommodated.

Figure 3:
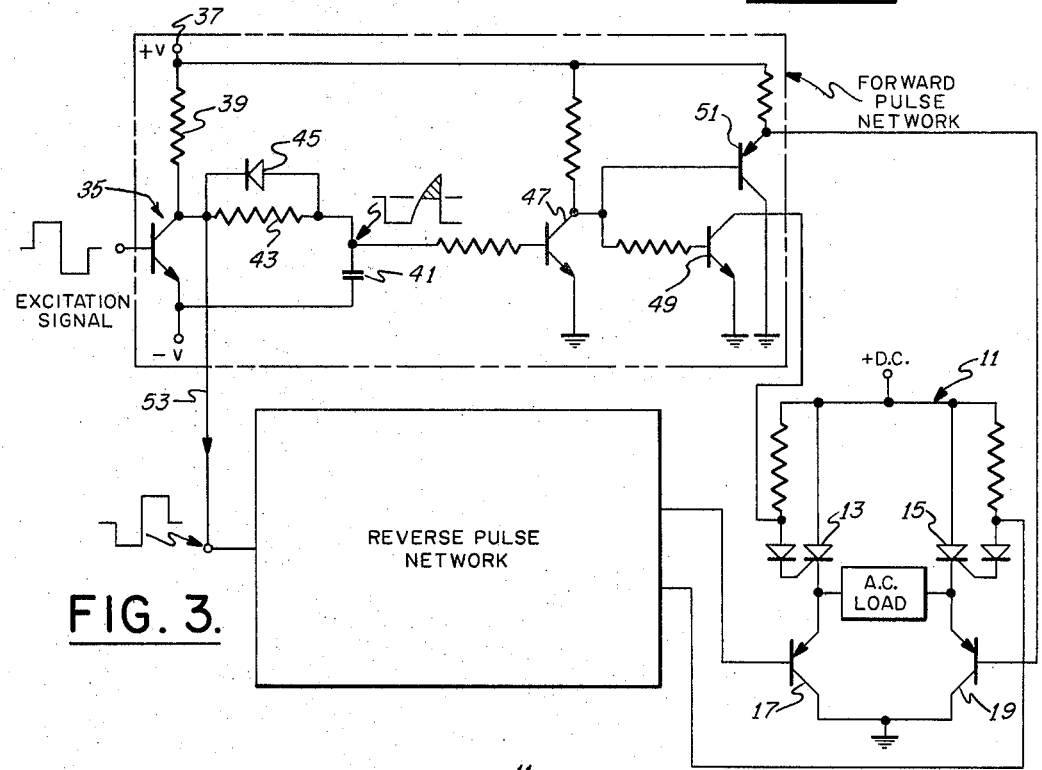
FIG. 3 is a circuit diagram, partly in block form, illustrating a presently preferred circuit embodying the principles of the invention.

FIG. 3 depicts a presently preferred external driving circuit for triggering an inverter bridge according to these principles.

Each pulse network operates so that a positive-going pulse applied to that network turns off the associated bridge elements immediately, whereas a negative-going pulse turns on the associated bridge elements after a specified time delay.

A suitable excitation signal is applied to the transistor 35 so that the transistor operates effectively as a switch that is opened on negative excursions of the excitation voltage, but closed on positive excursions. The emitter electrode of the transistor is coupled to a source of negative voltage. The collector is connected to a source of positive voltage 37 through a resistor 39.

The collector-to-emitter voltage of this transistor is applied to a selective delay circuit comprising a capacitor 41 in series with a resistor 43. A diode 45 is connected across the resistor so as to permit current flowing out of the capacitor to bypass this resistor. When the transistor 35 is driven into a nonconducting region by a suitable input signal, the capacitor 41 acquires a positive charge at a rate determined by the value of the resistors 39 and 43 and the capacitance of this capacitor. When the transistor 35 is driven to a highly conducting region, however, the capacitor 41 discharges rapidly through the low forward resistance of the diode 45 and the transistor 35. In its discharged condition, capacitor 41 is at a negative voltage level determined by the source of negative emitter voltage applied to the transistor 35. An n-p-n transistor 47 is connected to the junction of the resistor 43 and the capacitor 41. The emitter of the transistor 47 is connected to ground and the collector to a suitable source of positive voltage. When the base voltage of the transistor 47 rises above ground potential, the transistor quickly saturates; when the base voltage is driven negative, the transistor is driven to cutoff. Since the voltage across the capacitor 41 rises gradually, but decays rapidly, there is a delay between the excitation signal and the turn-on time of the transistor 47, but substantially no delay between the excitation signal and the turn-off time of this transistor. The voltage appearing at the collector of this transistor approximates a rectangular wave. This voltage is applied to a pulse inverting stage 49 and to a buffer stage 51. The transistor 47, together with the inverter stage 49 and the buffer stage 51, constitutes a trigger means capable of turning one pair of switching elements in the bridge on or off.

The inverted pulse from the inverter stage 49 is coupled to the gate electrode of the controlled rectifier 13 in the bridge circuit 11. The buffer stage 51 preserves the polarity of the pulse fed into it. The output from this stage is coupled to the transistor 19 which forms the bridge arm opposite the controlled rectifier 13. The pulses applied to these two elements in the bridge are thus capable of turning the two elements on or off simultaneously and controlling the flow of current through the load in the forward direction.

A second or reverse pulse network, essentially identical to the forward pulse network, is provided to control the second pair of electron devices. The excitation signal for this network is passed through a pulse inverter so that the two networks are supplied with out-of-phase signals. This pulse inversion may conveniently be accomplished by means of a conductor 53 connected to the collector of the transistor 35.

A negative-going pulse applied to the transistor 35 drives this element to cut off. This produces an increases positive voltage on the collector as well as a positive-going pulse at the input of the reverse channel which acts to turn off the elements 15 and 17 in the bridge. The same original pulse also permits the capacitor 41 to charge. When this capacitor acquires sufficient charge to cause the transistor 47 to conduct, the triggering means causes a pulse to turn on the bridge elements 13 and 19. When the polarity of the excitation signal applied to transistor 35 is reversed, a signal is produced immediately at the output of the forward pulse network, turning off the elements 3 and 19. The time delay in the reverse network now operates to postpone the turning on of the elements 15 and 17 for a specified time.

Transistor 35 thus operates as a reversing means that acts to transpose the polarity of the output pulses and the sequence of operation of the forward and reverse networks.

The magnitude of the collector and emitter voltages supplied to the transistors in the driving means is largely a matter of choice in design. If the emitter voltage supplied to the buffer stage 51 exceeds the bridge supply voltage, however, the bridge transistors can be back biased during turnoff. Experiments indicate that increasing this back bias tends to shorten the time necessary to turn off the transistors. Furthermore, the higher values of back bias tend to make the turnoff time independent of changes in temperature and load current.

In a practical embodiment of the invention, an inverter was operated satisfactorily throughout the frequency range of 15–700 cycles per second without changing the magnitude of the time delay.

Although the circuit that has been described utilizes solid state electron devices, the same principles apply to circuits employing the electron tube counterparts of these devices.

A specific circuit has been described to illustrate a practical driving means, however many variants of this particular circuit may be devised to perform the same function.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. An inverter comprising first and second pairs of electron devices, a controlled rectifier and a transistor in each of said pairs, said pairs being arranged to pass current in opposite directions through a load, driving means to switch the flow of current alternately between the two pairs, said driving means including a delay means to postpone turning on one pair of electron devices until the other pair has been turned off for a specified time.

2. An inverter comprising first and second pairs of electron devices, a controlled rectifier and a transistor in each of said pairs, said pairs being arranged to pass current in opposite directions through a load, driving means to turn off either pair of electron devices and to turn on the opposite pair, said driving means including a delay means to postpone turning on one pair of electron devices until the opposite pair has been turned off for a specified time, and means to turn the individual pairs on alternately.

3. Apparatus for connecting a unidirectional voltage source to an alternating current load comprising a first pair of electron devices connected to pass a current through the load in a forward direction; a second pair of electron devices connected to pass a current through the load in a reverse direction; a controlled rectifier in each of said pairs; a transistor in each of said pairs; driving means to turn off either pair of electron devices and to turn on the other pair; said driving means including a delay means to postpone turning on a pair of electron devices until the other pair has been turned off for a specified time, and reversing means to turn the individual pairs on alternately.

4. An inverter comprising first and second pairs of electron devices connected to pass a current in alternate directions through a load, a transistor in each of said pairs, forward and reverse pulse networks connected to said first and second pairs of electron devices respectively, each of said pulse networks being constructed to convert an excitation signal of a given polarity into a trigger voltage for turning on the associated pair of electron devices, trigger means in each of said pulse networks, a selective delay means in each of said pulse networks constructed to provide a time interval between the reception of an excitation signal and the actuation of the trigger means, said delay means being further constructed to terminate the trigger voltage simultaneously with a reversal from the given polarity of the excitation signal, each of said transistors being connected to its respective pulse network so as to be back biased whenever a trigger voltage is not being produced by that pulse network, and pulse inverter means to invert the polarity of the excitation signal supplied to one pulse network.

5. An inverter comprising:
(a) first and second pairs of electron devices connected to pass a current in alternate directions through a load,
(b) forward and reverse pulse networks connected to said first and second pairs of electron devices respectively,
(c) each of said pulse networks being constructed to convert an excitation signal of a given polarity into a trigger voltage for turning on the associated pair of electron devices, each of said pulse networks being further connected to the respective pair so as to back bias an electron device in this pair in the absence of a trigger voltage,
(d) trigger means in each of said pulse networks,
(e) a selective delay means connected to each trigger means,
(f) a capacitor in each delay means arranged to actuate said trigger means when the charge on the capacitor reaches a predetermined value,
(g) a resistor connected in series with said capacitor to limit the charging rate of the capacitor,
(h) a diode shunted across said resistor to provide a low resistance discharge path for said capacitor,
(i) reversing means to cause said capacitor to charge and discharge in accordance with the polarity of the excitation signal,
(j) and pulse inversion means to invert the polarity of the excitation signal supplied to one pulse network.

6. Apparatus for connecting a unidirectional voltage source to a pair of load terminals comprising a first pair of electron devices connecting said source to said load terminals so that a forward voltage may be applied to the load terminals, a second pair of electron devices connecting said source to said load terminals so that a reverse voltage may be applied to the load terminals, each of said pairs of electron devices including a silicon controlled rectifier with its anode connected to the positive terminal of said voltage source and a transistor connected to the negative output terminal of said voltage source, and driving means connected to each electron device to turn said first and second pairs on alternately, said driving means including a delay means to postpone turning on either pair of electron devices until the opposite pair has been turned off for a specified time.

7. Apparatus for connecting a unidirectional voltage source to a pair of load terminals comprising a first pair of electron devices connecting said source to said load terminals so that a forward voltage may be applied to the load terminals, a second pair of electron devices connecting said source to said load terminals so that a reverse voltage may be applied to the load terminals, each of said pairs of electron devices including a silicon controlled rectifier with its anode connected to the positive terminal of said voltage source and a transistor connected to the negative output terminal of said voltage source, and trigger means coupled to each electron device to render said first and second pairs alternately conductive.

8. An inverter comprising:
(a) a source of direct current having positive and negative output terminals,
(b) a bridge circuit connected across said source,
(c) said bridge circuit including
(1) first and second silicon controlled rectifiers forming adjacent arms of the bridge and having their anodes connected to the positive terminal of said source,
(2) first and second transistors each forming an arm of the bridge opposite the first and second silicon controlled rectifiers respectively,
(d) a first trigger means for turning off the first rectifier and the first transistor simultaneously,
(e) a second trigger means for turning on the second rectifier and the second transistor simultaneously,
(f) a delay means to actuate the second trigger means a predetermined time after the operation of the first trigger means, and
(g) means for reversing the output polarity and sequence of operation of the trigger means.

9. Apparatus for connecting a unidirectional voltage source to a pair of alternating current load terminals comprising:
(a) a first pair of electron devices for connecting the source to the load terminals in a forward direction,
(b) a second pair of electron devices for connecting the source to the load terminals in a reverse direction,
(c) each of said pairs containing a silicon controlled rectifier having its anode connected to the positive side of said source,
(d) each of said pairs further containing a transistor connected to the negative side of said source,
(e) the first of said pair of load terminals being connected to the cathode of the silicon controlled rectifier and the transistor in said first pair,
(f) the second of said pair of load terminals being connected to the cathode of the silicon controlled rectifier and the transistor in said second pair, and
(g) trigger means coupled to each electron device to render said first and second pairs alternately conductive.

10. An inverter comprising:
(a) a unidirectional voltage source having positive and negative terminals;
(b) first and second silicon controlled rectifiers each having an anode, a cathode, and a gate electrode;
(c) conducting means connecting the anodes of said rectifiers to said positive source terminal;
(d) first and second load terminals coupled respectively to the cathode terminals of said rectifiers;
(e) first and second p-n-p transistors each having an emitter, a collector and a base electrode;
(f) conducting means connecting the collector electrodes of the transistors to said negative source terminal;
(g) conducting means connecting the emitter electrode of the first transistor to the second load terminal and the emitter electrode of the second transistor to the first load terminal;
(h) a first trigger means for simultaneously applying a negative voltage to the gate electrode of the first rectifier and a positive voltage to the base of the first transistor;
(i) a second trigger means for simultaneously applying a positive voltage to the gate electrode of the second rectifier and a negative voltage to the base of the second transistor;
(j) delay means to actuate said second trigger means a predetermined time after the operation of the first trigger means; and
(k) means for reversing the output polarity and the sequence of operation of the trigger means.

References Cited by the Examiner

UNITED STATES PATENTS 2,821,639   1/1958   Bright et al. _____ 321—47 X
3,074,030   1/1963   Hierholzer _____ 331—113

LLOYD McCOLLUM, *Primary Examiner.*

M. L. WACHTELL, A. J. GAJARSA,
                              *Assistant Examiners.*